June 26, 1951
J. KINNEY, JR
2,558,093
PROCEDURE FOR MAKING COMPOSITE METAL STRIP
Filed Sept. 20, 1944
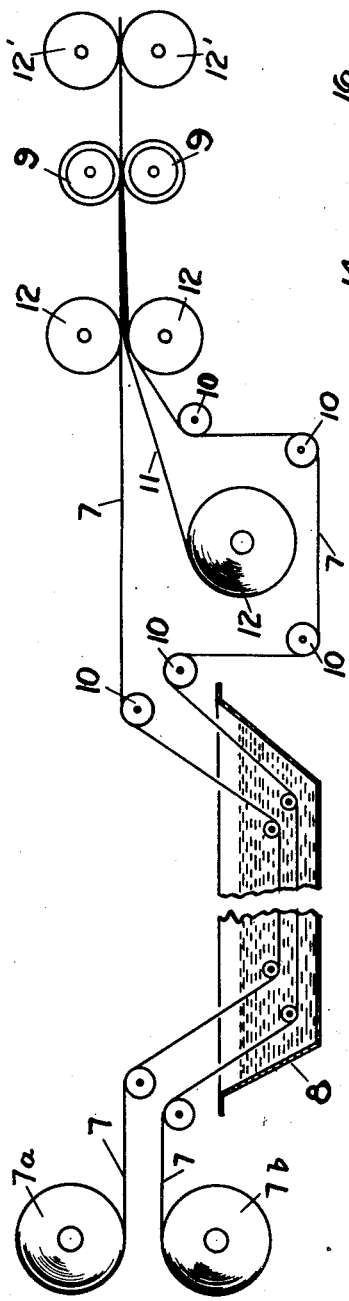
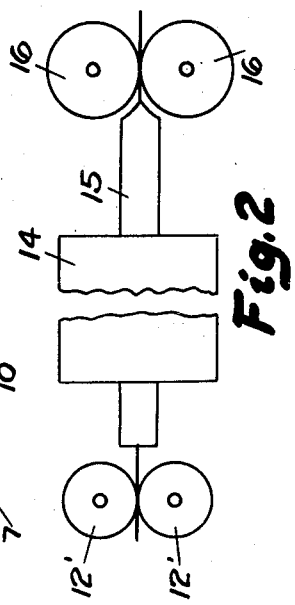
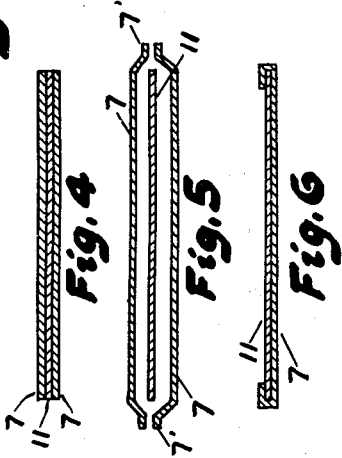
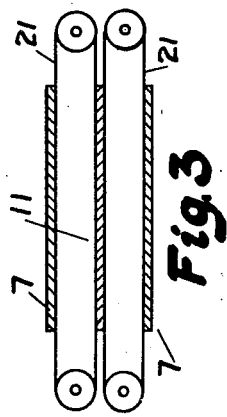
INVENTOR
Joseph Kinney Jr.
BY
his ATTORNEYS Patented June 26, 1951

2,558,093

UNITED STATES PATENT OFFICE 2,558,093

PROCEDURE FOR MAKING COMPOSITE METAL STRIP

Joseph Kinney, Jr., Bradford Woods, Pa., assignor to American Cladmetals Company, a corporation of Pennsylvania Application September 20, 1944, Serial No. 554,925

1 Claim. (Cl. 29—189)

This invention relates to multi-ply composite metal in the form of strip and suitable for use in the production of utensils for domestic, institutional and industrial use and for the production also of such articles as engine bearings and electrical contacts, etc. The invention also relates to procedure for continuously forming such stock in strip form, the component metals being chrome-nickel stainless steel and substantially oxygen-free copper.

I am familiar with the fact that various procedures have been employed for the production of composite or multi-ply metal stock. For example, I am familiar with the procedure employed in what is termed the "jeweler's art" wherein multi-ply stock is produced by interposing layers of brazing metal between the principal component metals of the completed stock. Such layers are, however, effective only at certain specific temperatures. I am also familiar with procedures wherein slabs or plates of copper and steel are heated to rolling temperatures and hot rolled in a multiplicity of passes after appropriate treatment such as pickling or the application of nickel coatings to the surfaces to be bonded, for the purpose of removing, or preventing the formation of objectional oxide coatings. I am also familiar with procedures in which one of the metals in the composite stock is cast under such conditions as to form, with the other metal or metals, a composite slab or ingot which, is subsequently fabricated by rolling or otherwise.

Procedures of the type outlined are, however, not wholly satisfactory where the purpose is to produce multi-ply stock in strip form and such that the strip may be subjected to the usual commercial fabricating steps such as pressing and deep drawing. One of the difficulties encountered with other old procedures is the control of the thickness of the various layers of metal which constitute the multi-ply stock. This is particularly true with combinations of metals such as copper and austenitic stainless steel where there is a wide variation in the rate of plastic deformation of the component metals at a given rolling temperature and under the pressures encountered in the bonding operation. Then too, the various metals constituting the multi-ply strip ordinarily respond quite differently to one or more of the various steps involved by the bonding procedure so that it is difficult, if not impossible, to work out a procedure which may be effectively and efficiently employed in the production of multi-ply strip stock.

In addition, the operation of making such rolled stock by the old procedure mentioned, necessarily involves the production of a relatively large amount of scrap. This scrap has little or no value as such, because of its multi-ply characteristics and even though the constituent metals in themselves are costly.

An object of this invention is a multi-ply composite metal strip in which the component metals are copper and austenitic stainless steel.

A further object is to provide a simple and effective procedure for producing such strip.

A further object is to provide such a procedure for consistently producing multi-ply composite metal strip of a desired gauge and in which a desired or predetermined relationship as to the thickness of the component layers of metal going into the makeup of the composite strip is consistently maintained.

A further object is to provide a procedure for continuously making multi-ply composite metal strip stock for use in the production of pressed and drawn articles of commerce and which when produced is uniform throughout all portions thereof and is in such a condition of ductility as is required for cold rolling and other forming operations such as cold drawing.

The procedure constituting the present invention fundamentally involves the separate rolling of the stainless steel and the copper components to strip form of a desired gauge. The component strips are then processed to provide surfaces having the requisite characteristics for bonding, i. e., surfaces which are clean and are substantially free from objectional oxides or other extraneous matter. The strips are then so manipulated that the prepared surfaces are placed in contact with each other and under conditions such as to substantially exclude air or oxygen therefrom. The strips are continuously heated while so combined and are then subjected to a rolling reduction while hot. The pressure applied is preferably such that it will subject the stainless steel to an appreciable reduction, i. e., a reduction of at least about 4%.

In carrying out the procedure broadly defined above, the cleansing of those surfaces of the strip which are to be bonded may be accomplished either mechanically or chemically. For example, the cleansing may be accomplished by abrasion or by appropriate pickling.

The operation of placing the bonding surfaces of the strip in contact with each other is somewhat critical, it is therefore desirable to edge weld the combined strips so as to preliminarily join the component strips together along their edges, thus aiding in holding them in position, relatively to each other, during subsequent bonding operation and in preventing free access of atmospheric air to the surfaces to be bonded while the combined strip is being so heated. The heating of the combined strip is accomplished continuously.

The reducing rolls are of such diameter and preferably operated under such "screwdown" or "backing-up roll" pressure as to accomplish a substantial reduction as well as a bonding of the metals of the composite strip. By this procedure the expense of surface processing is minimized per unit of volume of composite strip produced, by reason of the reduction and corresponding increase in strip length. The rolls are preferably maintained at a temperature substantially below that of the metal delivered to them.

I have found that there is an advantage in heating the combined strip to the annealing temperature of the stainless steel since under such conditions, the bonding of the strip also provides strip which may be immediately subjected to cold rolling operations and even some cold drawing operations, without the necessity of further heating. Under usual operating conditions, I introduce the combined component strips into the bonding pass while the stainless component is at the full annealing temperature of austenitic stainless steel strip (at least about 1950° F.), and thus simultaneously bond the component strips and anneal the stainless steel component of the composite strip and thereby produce a composite, multi-ply strip which will readily respond to forming operations.

In commercial operations, it is desirable that the component strips exist at a temperature within the temperature range of from about 1650° F. to about 2100° F. at the time the combined strip is gripped by the reducing rolls. It will be noted that the upper limit of the range stated is above the melting point of copper but, even so I have successfully operated at temperatures above such melting point, where the copper strip was sandwiched between two stainless steel strips, and have attained excellent results.

The lower limit of the range as above given is selected because of the stainless steel components of the strip, since prolonged heating at temperatures below 1650° F. may occasion an undesirable carbide precipitation in the steel. Temperatures adjacent the lower limits are, however, employed in connection with copper alloys (brass and some bronze) having a melting point below that of pure copper. The bonding may, however, be accomplished at temperatures substantially below the annealing temperature of the stainless steel although I advocate increasing the bonding pressure where lower temperatures are employed. It will thus be apparent that it is not essential to produce composite strip which is in the annealed condition at the completion of the bonding operation. The bonding may be accomplished by heating the combined strips to a temperature substantially below the bonding temperature and then subjecting the strips so heated to a single roll pass reduction of such magnitude as to increase the temperature of the stainless steel as well as that of the metals involved. Bonding under conditions such as above noted also occasions such an extrusion or spread of the metals involved as to minimize the affect of any defects, including such surface defects as would normally militate against effective bonding.

To assure effective procedure and a useful product, it is preferable that the completed strip should be about 0.125" thick, and I prefer that the steel component thereof shall not be more than about 0.0625" thick. It is also desirable to limit the reduction occasioned by the bonding operation to the order previously mentioned. It follows, therefore, that each component strip must be separately reduced to a gauge about equal to the desired thickness of the metal thereof in the finished strip. This practice avoids objectionable concentration of defects, especially surface defects, and facilitates quick and uniform heating under conditions such that the steel component is not retained at a detrimental temperature for a substantial period. Then too, the bonding may be accomplished by a single pass through reducing rolls of about 14" diameter where the completed strip is from 15" to 20" wide.

It may be that the agitation of the atoms of the component metals, set up by the rapid heating and the momentary application of bonding pressure, contributes to the bonding but by employing relatively thin strips of the component metals, I am able to accomplish effective bonding without subjecting the component metals to extended heating or to an excessive bonding pressure for long periods.

In the accompanying drawings, Figure 1 is a diagrammatic view of apparatus which may be employed in carrying forward a portion of the procedure here outlined. Figure 2 is a diagrammatic disclosure of apparatus which supplements the apparatus illustrated in Figure 1. Figure 3 is a diagrammatic illustration of mechanical means for surface processing the metal strips as a preliminary to the bonding operation. Figure 4 is a diagrammatic illustration of a three-ply metal strip in which the combined strips are edge welded for reasons previously stated. Figure 5 is an exploded view of the combined elements of a composite strip in which the central strip is copper or a copper alloy and the outer strips are stainless steel. The arrangement here provides for edge welding of the stainless strips only. Figure 6 indicates a two-ply arrangement of strips in which one of the two strips is so formed that it overlaps the lateral edges of the other strip thereby combining the strips and excluding free access of air. Such an arrangement may also be employed as a preliminary to edge welding where edge welding is employed.

In Figure 1, the stainless steel strip 7 is illustrated as passing from coils 7a and 7b through a receptacle 8 in their movement toward edge welding apparatus diagrammatically illustrated as consisting of two opposed rolls 9. The receptacle 8 may be part of an electro-plating apparatus, such as is normally used for continuously plating strip, or it may be merely a part of the usual form of picking apparatus. As illustrated, the strips 7 of the stainless steel, move in spaced relationship through the receptacle 8 and then over a series of guiding rollers 10 which are so located and arranged that the spacing of the moving strips 7 is such as to provide for the introduction between them of a copper strip 11 drawn from a coil 11a. For the sake of brevity, I have omitted a disclosure of such washing and drying apparatus as will be employed in connection with pickling procedure or electro-plating—if electro-plating is employed.

The edge welding may, and preferably will be accomplished by apparatus such as is usually employed for that purpose and the welding heat will preferably be electrically applied. I employ pinch rolls for the double purpose of holding the component strips (7—11—7) in contact with each other and also propelling and guiding the combined strips through the edge welding apparatus. As shown in the diagrammatic illustration, a pair of pinch rolls 12 of substantial diameter receive the two stainless strips 7 and the copper strip 11 under conditions such as to force them into intimate contact with each other. In Figure 1 the pinch rolls 12—12 are shown spaced apart and the moving strips 7—11—7 are also shown as spaced apart. This, however, is for convenience of illustration since the pinch rolls there illustrated are intended to operate as pinch rolls and to force the three strips into intimate contact. These rolls are located on the intake side of the edge welding apparatus and are preferably located adjacent to that apparatus. A pair of similar pinch rolls 12' receive the combined strip leaving the welding apparatus 9. These rolls are guiding rolls but they may also propel the strip toward the heating mechanism and consequently toward the reducing rolls.

The pinch rolls 12 and 12' are preferably so driven that the combined strips are held in tension between them and the relationship of speed of the rolls 12' to that of the reducing rolls is preferably such that the rolls 12' occasion a drag on the strip entering the reducing rolls. After leaving the pinch rolls 12', the combined and edge welded strip passes through a heating mechanism and then to the reducing rolls.

It will, of course, be understood that the heating of the combined strip may be accomplished in any desired manner and the apparatus diagrammatically illustrated in Figure 2 is merely intended to disclose a heating mechanism of a type such that the heating of the strip may be accomplished in a neutral atmosphere. As is usual practice, the gaseous medium, constituting the neutral atmosphere, will be maintained under pressure within the heating chamber 14 of the mechanism and, if a neutral atmosphere is employed, this chamber may be, and preferably will be provided with a delivery passage 15 which is so formed that it, in effect, extends into the pass of the reducing rolls 16 and thus surrounds the heated strip and insures that it is enveloped by the neutral medium up to the time it is gripped by the reducing rolls.

The reducing mechanism is diagrammatically illustrated as two opposed rolls 16, i. e., as a simple stand of rolls. It will, however, be understood that any type commercial mill may be employed and that a multiplicity of roll passes may also be used.

The strip on leaving the rolls 16 is quenched for the purpose of completing the annealing of the stainless steel component thereof. Any commercial method of quenching may be employed but preferably one which preserves the surface condition of the strip. As a matter of fact, the strip may be quenched and passed through a suitable pickling solution or passivating solution on its way toward the coiler or the shears, if it is to be cut into commercial lengths.

In Figure 3, I have disclosed a more or less conventional apparatus for mechanically cleansing the surfaces of the strip which are to be placed in contact for bonding. I have there illustrated two abrading and cleaning belts 21, which are located in parallel relationship and so spaced that they are capable of simultaneously cleaning and abrading four surfaces, i. e., the inner surface of the upper strip 7, both the upper and the lower surfaces of the copper strip 11 and the upper surface of the lower strip 7. Each belt 21 is an endless belt and is of such width and is driven at the speed necessary to accomplish the desired surface processing as the strip, moving lengthwise of itself, engages the belt. That is to say, the mechanical processing of the strip surfaces is accomplished as a continuous process and at a time and under conditions such as will avoid appreciable oxidation of the processed surface prior to bonding.

It will be apparent that such an arrangement of apparatus not only accomplishes a mechanical cleaning of the surfaces involved but that it also provides an approximation of matte surfaces which generally facilitate bonding operations. If the copper strip is practically free from oxide it will not be necessary to subject it to surface processing, unless for the purpose of removing oil or some other extraneous material. Where the bonding surfaces of the stainless steel strips are coated with copper, as a step in the bonding operation, further surface processing will be unnecessary under normal operating conditions.

In Figure 5, I have illustrated the stainless steel strips 7 as somewhat wider than the copper strip 11 and as having an edge formation which will contribute to the welding of those strips together so that they enclose the copper strip. The edges 7' extend beyond the edges of the strip 11 and are distorted by the edge welding operation, as indicated in the drawing, but so that the overhanging edges on each side of the strip contact and are welded together. It will be understood that where edge welding of this type is employed, an edge trimmer will also be employed, especially when the composite strip is to be coiled and sold in that form.

The strip formation diagrammatically illustrated in Figure 6 may also be edge welded and whether or not edge welding is restorted to it may be desirable to edge trim this strip. While I have illustrated the composite strip as made up of but two or three component strips, it will be apparent that several component strips may be included in the make up of each composite strip although commercial conditions usually require but two or three such strips.

With reference to Figures 1 and 2, it should be noted that both are diagrammatic not only as to the apparatus illustrated but also as to the relative locations of the various pieces of apparatus. For example, under normal operating conditions it will be desirable to not only locate each of the pinch rolls 12 and 12' immediately adjacent to the edge welding apparatus but it will also be desirable to locate the pinch rolls 12 close to such surface processing apparatus as is employed, i. e., close to such washing and drying mechanism as is employed with the electro-plating or pickling apparatus (Figure 1) or close to the mechanical cleaning apparatus of Figure 3.

It will, of course, be understood that the combined strip leaving the edge welding apparatus 9 may be loosely coiled for subsequent continuous operations. That is to say, it is desirable but not absolutely essential that the bonding operation immediately follow the combining of the multiply strip and the edge welding of the same. As to this, it must be borne in mind that oxidation on the surfaces to be bonded may prevent effective bonding.

In carrying forward the process here outlined, it is highly desirable to employ copper which is practically devoid of free oxygen, independently of whether the copper is termed oxygen-free copper, OFHC copper, or deoxidized copper. During the heating operation the oxygen, ambient in the copper, tends to unite with such hydrogen as may be given off by the steel and the chemical combination between the two will detract from the effectiveness of the bonding operation, may occasion a phenomenon known as "embrittlement" and may also produce corrosive regions in the completed strip. From this, it will be apparent that copper, substantialy free of oxygen, is desirable not only from the standpoint of the bonding procedure but also from the standpoint of the performance of the products resulting from that procedure. Where a high degree of conductivity is required in the composite metal strip, OFHC copper will preferably be employed rather than deoxidized copper.

As indicated herein, the procedure may be carried forward in the bonding of at least some of the copper alloys with stainless steel. My experience indicates that many copper alloys having a melting point substantially the same or lower than that of pure copper may be effectively bonded with stainless steel in accordance with the process here defined. It, therefore, follows that the procedure may also be employed for the purpose of bonding higher melting point alloys with stainless steel and that this may be accomplished by increasing the bonding temperature to some extent. I have, however, not attempted to bond the higher melting point alloys with stainless steel. Attention should also be drawn to the fact that some copper alloys, and particularly those containing silicon as an alloying constituent, are highly susceptible to objectionable oxidation and, as a matter of fact, oxidize under conditions such as would prevent their effective utilization in a bonding process such as is here described unless severe precautions were taken to prevent further oxidation after the same had been removed by surface processing.

While I have referred particularly to austenitic stainless steel, I note that the procedure here defined contemplates a wide variety of such steels and also some stainless steels which are not regularly classes as austenitic steels because of characteristics exhibited at room temperatures and lower temperatures. It will also be understood that various changes in, additions to and omissions from, the procedure here disclosed may be made without departing from the spirit and scope of my invention as defined by the appended claim.

What I claim is:

A method of continuously bonding chrome-nickel stainless steel and copper to produce a composite metal strip, which consists in separately reducing a quantity of each such metal to strip form; processing at least a surface of the steel strip to remove substantially all metallic oxides therefrom; moving each strip longitudinally of itself and at the same rate of movement as that of the other strip and while so moving bringing the strips into contact with each oher with the processed surface of the stainless steel strip contacting a surface of the copper strip; edge welding the contacting strips while continuing such longitudinal movement; heating the edge welded strips during such movement to at least the annealing temperature of the stainless steel strip; subjecting the so heated edge welded strip to a rolling reduction to bond the same; and then cooling the resulting composite strip while extended and while continuing the longitudinal movement thereof.

JOSEPH KINNEY, Jr.

REFERENCES CITED

The following references are of record in the file of this patent:

UNITED STATES PATENTS

| Number | Name | Date |
|---|---|---|
| 244,230 | Haegele | July 12, 1881 |
| 685,758 | Griffith | Nov. 5, 1901 |
| 785,979 | Schmidt | Mar. 28, 1905 |
| 1,302,563 | Klocke | May 6, 1919 |
| 1,904,241 | Kammerer | Apr. 18, 1933 |
| 2,138,982 | Raydt | Dec. 6, 1938 |
| 2,145,234 | Cooper | Jan. 31, 1939 |
| 2,160,559 | Orr, Jr. | May 30, 1939 |
| 2,210,338 | Quarnstrom | Aug. 6, 1940 |
| 2,212,715 | Levan | Aug. 27, 1940 |
| 2,258,327 | Kramer | Oct. 7, 1941 |
| 2,278,744 | Sparrow | Apr. 7, 1942 |

FOREIGN PATENTS

| Number | Country | Date |
|---|---|---|
| 300,272 | Great Britain | Jan. 17, 1929 |
| 446,439 | Great Britain | Apr. 30, 1936 |